United States Patent [19]

Murai et al.

[11] Patent Number: 5,177,793
[45] Date of Patent: Jan. 5, 1993

[54] ACCURATE RECOGNITION OF INPUT PATTERNS

[75] Inventors: Yasumasa Murai; Toshifumi Yamauchi, both of Tokyo, Japan

[73] Assignee: NEC Corporation, Tokyo, Japan

[21] Appl. No.: 585,454

[22] Filed: Sep. 20, 1990

[30] Foreign Application Priority Data

Sep. 20, 1989 [JP]  Japan .................... 1-244100

[51] Int. Cl.⁵ .................................... G06K 9/64
[52] U.S. Cl. .......................... 382/30; 382/34; 382/13
[58] Field of Search ............ 382/30, 34, 13, 38, 382/41

[56] References Cited

U.S. PATENT DOCUMENTS

| | | |
|---|---|---|
| 4,040,009 | 8/1977 | Kadota et al. .......... 382/38 |
| 4,956,870 | 9/1990 | Hara ....................... 382/30 |
| 4,975,974 | 12/1990 | Nishijima et al. ....... 382/30 |

Primary Examiner—Michael T. Razavi
Assistant Examiner—Yon Jung
Attorney, Agent, or Firm—Sughrue, Mion, Zinn, Macpeak & Seas

[57] ABSTRACT

On recognizing first through P-th input patterns as first through P-th recognized patterns (P being greater than one) by using a plurality of reference patterns and a plurality of memorized indentifiers identifying the reference patterns, a processing circuit processes the first through the P-th input patterns into first through Q-th provisional patterns different from one another, where Q is not greater than the above-mentioned plurality. A calculating circuit calculates dissimilarity degrees had by the reference patterns relative to the first through the Q-th provisional patterns to select, with repetition allowed as selected patterns, the reference patterns which have the dissimilarity degrees less than a predetermined degree. The calculating circuit thereby selects R particular identifiers and S different identifiers from the memorized identifiers, where R plus S is not greater than P and is not less than the plurality. Each particular identifier and each different identifier identify only one pattern and one of at least two patterns of the selected patterns. The other at least one of the above-mentioned at least two patterns is identified by at least one of the R particular identifiers. A determining circuit determines first through P-th output identifiers identifying the first through the P-th recognized patterns by using the R particular identifiers as ones, R in number, and others, S in number, of the first through the P-th output identifiers.

9 Claims, 6 Drawing Sheets

| #1 | #2 | #3 | #4 | #5 | #6 |
|----|----|----|----|----|----|
| 4  | 5  | 0  | 8  | 8  | 1  |

| #7 | #8 | #9 | #10 | #11 | #12 |
|----|----|----|-----|-----|-----|
| 0  | 9  | 7  | 8   | 2   | 8   |

| #13 | #14 | #15 | #16 | #17 | #18 |
|-----|-----|-----|-----|-----|-----|
| 6   | 7   | 5   | 2   | 7   | 7   |

FIG. 3
PRIOR ART

|  | #1 | #2 | #3 | #4 | #5 | #6 |  |
|--|----|----|----|----|----|----|--|
|  | 4  | 5  | 0  | 8  | 8  | 7  | INPUT CHARACTER PATTERN |
|  | 4  | 5  | 0  | 8  | 3  | 1  | CANDIDATE IDENTIFIER |
|  |    | 8  | 6  |    | 8  | 7  |  |
|  |    | 4  |    |    |    |    |  |
|  | 4  | ?  | ?  | 8  | ?  | ?  | OUTPUT IDENTIFIER |

|  | #7 | #8 | #9 | #10 | #11 | #12 |  |
|--|----|----|----|-----|-----|-----|--|
|  | 0  | 9  | 7  | 8   | 2   | 8   | INPUT CHARACTER PATTERN |
|  | 0  | 9  | 7  | 3   | 2   | 8   | CANDIDATE IDENTIFIER |
|  | 6  | 4  |    | 8   |     |     |  |
|  | ?  | ?  | 7  | ?   | 2   | 8   | OUTPUT IDENTIFIER |

|  | #13 | #14 | #15 | #16 | #17 | #18 |  |
|--|-----|-----|-----|-----|-----|-----|--|
|  | 6   | 7   | 8   | 2   | 7   | 7   | INPUT CHARACTER PATTERN |
|  | 6   | 1   | 5   | 2   | 7   | 7   | CANDIDATE IDENTIFIER |
|  |     | 7   | 8   |     |     |     |  |
|  |     |     | 4   |     |     |     |  |
|  | 6   | ?   | ?   | 2   | 7   | 7   | OUTPUT IDENTIFIER |

30
REFERENCE
PATTERN
MEMORY

FIG. 6

| PROVISIONAL IDENTIFIER | PROVISIONAL PATTERN | THE NUMBER OF SAME PROVISIONAL PATTERNS | CANDIDATE IDENTIFIER | OUTPUT IDENTIFIER |
|---|---|---|---|---|
| a | 4 | 1 | ④ | 4 |
| b | 5 | 2 | 5 ✗ ✗ | 5 |
| c | 6 | 2 | 0 ✗ | 0 |
| d | 8 | 2 | ⑧ | 8 |
| e | 8 | 2 | 3 ✗ | 3 |
| f | 7 | 2 | 1 ✗ | 1 |
| g | 9 | 1 | 9 ✗ | 9 |
| h | 7 | 3 | ⑦ | 7 |
| i | 2 | 2 | ② | 2 |
| j | 6 | 1 | ⑥ | 6 |

FIG. 7

ACCURATE RECOGNITION OF INPUT PATTERNS

BACKGROUND OF THE INVENTION

This invention relates to a pattern recognition method and relates also to a pattern recognition device for use in carrying out the method.

A pattern recognition device is for recognizing an input pattern signal representative of first through P-th input patterns by selecting first through P-th recognized patterns from a plurality of reference patterns, where P represents a first integer which is greater than one. The device thereby produces a recognition result signal indicative of first through P-th output (or true) identifiers identifying the first through the P-th recognized patterns. The pattern recognition device is typically a character recognition device which deals with the input pattern signal representing first through P-th input character patterns as the first through the P-th input patterns.

In the manner which will later be described in more detail, a conventional character recognition device comprises a reference pattern memory, namely, a character dictionary memory, which memorizes a plurality of basic reference character patterns as the reference patterns and a plurality of memorized identifiers identifying the basic reference character patterns. The character dictionary memory further memorizes a plurality of additional or modified reference character patterns corresponding to the memorized identifiers. The additional character patterns are given by modifying the basic reference character patterns. Supplied with the input pattern signal, the conventional character recognition device compares each of the input character patterns with each of the basic and the additional reference character patterns, and searches, as a searched pattern, a particular one of the basic and the additional reference character patterns that has the lowest dissimilarity with the input character pattern under consideration. In other words, the particular one of the basic and the additional reference character patterns having the largest similarity with the input character pattern under consideration. The conventional character recognition device thereby produces one of the memorized identifiers that corresponds to the searched pattern.

It is, however, difficult to prepare the reference pattern memory which memorizes a great number of the additional reference character patterns into which the basic reference character patterns are modified. Therefore, it is difficult for the conventional character pattern recognition device to accurately recognize each of the input character patterns.

SUMMARY OF THE INVENTION

It is therefore an object of this invention to provide a pattern recognition method which can accurately recognize input patterns.

It is another object of this invention to provide a pattern recognition method of the type described, which can accurately recognize input patterns by using only basic reference patterns.

It is still another object of this invention to provide a pattern recognition method of the type described, wherein it is not necessary to memorize modified reference patterns into which the basic reference patterns are modified.

It is a further object of this invention to provide a pattern recognition device which can accurately recognize input patterns.

It is still a further object of this invention to provide a pattern recognition device of the type described, which can accurately recognize input patterns by using a reference pattern memory memorizing only basic reference patterns.

It is yet a further object of this invention to provide a pattern recognition device of the type described, wherein it is not necessary to memorize in the reference pattern memory modified reference patterns into which the basic reference patterns are modified.

Other objects of this invention will become clear as the description proceeds.

On describing the gist of this invention, it is possible to understand that a method is for recognizing an input pattern signal representative of first through P-th input patterns by selecting first through P-th recognized patterns from a plurality of reference patterns to produce a recognition result signal indicative of first through P-th output identifiers identifying the first through the P-th recognized patterns, where P represents a first integer which is greater than one.

According to this invention, the above-understood method comprises the steps of: (A) memorizing the reference patterns and a plurality of memorized identifiers identifying the reference patterns; (B) processing, supplied with the input pattern signal, the first through the P-th input patterns into first through Q-th provisional patterns, where Q represents a second integer which is not greater than the number of the plurality of memorized identifiers; (C) calculating dissimilarity degrees had by the reference patterns relative to the first through the Q-th provisional patterns to select, with repetition allowed, the reference patterns which have the dissimilarity degrees as selected patterns less than a predetermined degree, the calculating step thereby selecting R particular identifiers and S different identifiers from the memorized identifiers corresponding to the selected patterns, where R plus S is not greater than the first integer and is not less than the second integer, each of the R particular identifiers identifying only one of the selected patterns and each of the S different identifiers identifying one of at least two of the selected patterns, at least one of the above-mentioned at least two of the selected patterns being identified by at least one of the R particualr identifiers; and (D) determining the first through the P-th output identifiers by using the R particular identifiers and the S different identifiers.

On describing the gist of this invention, it is furthermore possible to understand that a pattern recognition device is for recognizing an input pattern signal representative of first through P-th input patterns by selecting first through P-th recognized patterns from a plurality of reference patterns to produce a recognition result signal indicative of first through P-th output identifiers identifying the first through the P-th recognized patterns, where P represents a first integer which is greater than one.

According to this invention, the above-understood pattern recognition device comprises: (A') a reference pattern memory for memorizing the reference patterns and a plurality of memorized identifiers identifying the reference patterns; (B') processing means supplied with the input pattern signal for processing the first through the P-th input patterns into first through Q-th provisional patterns, where Q represents a second integer which is not greater than the number of the plurality of reference patterns; (C') dissimilarity calculating means connected to the reference pattern memory and the processing means for calculating dissimilarity degrees had by the reference patterns relative to the first through the Q-th provisional patterns to select, with repetition allowed, the reference patterns which have the dissimilarity degrees less than a predetermined degree as selected patterns, the dissimilarity calculating means thereby selecting R particular identifiers and S different identifiers from the memorized identifiers corresponding to the selected patterns, where R plus S is not greater than the first integer and is not less than the second integer, each of the R particular identifiers identifying only one of the selected patterns, and each of the S different identifiers identifying one of at least two of the selected patterns, at least one of the above-mentioned at least two of the selected patterns being identified by at least one of the R particular identifiers; and (D') determining means connected to the dissimilarity calculating means for determining the first through the P-th output identifiers by using the R particular identifiers and the S different identifiers.

DESCRIPTION OF THE PREFERRED EMBODIMENT

Figure 1:
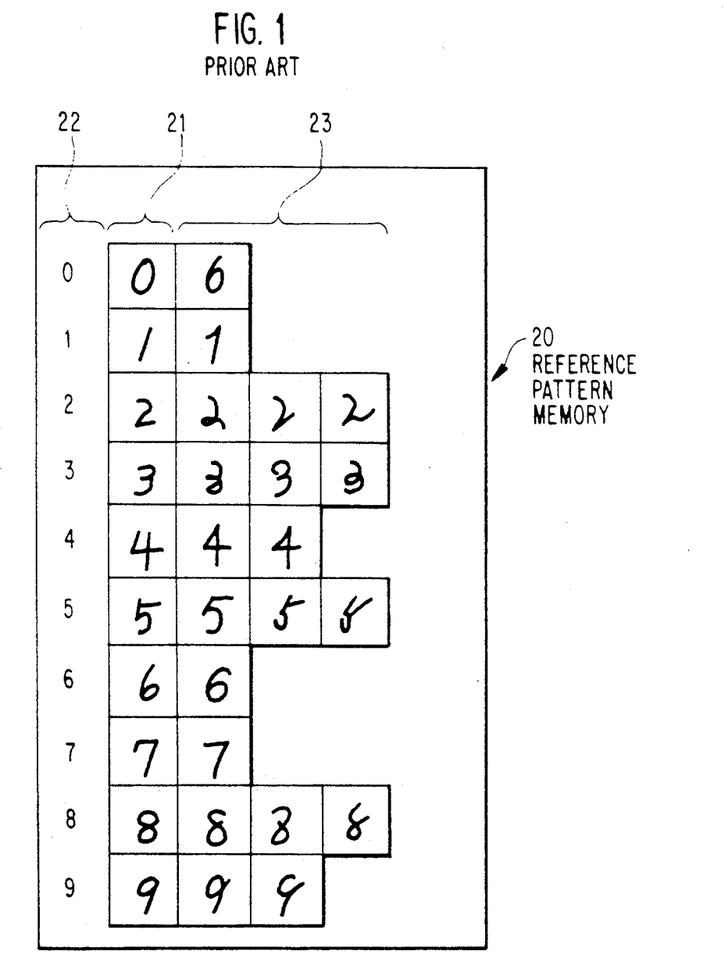
FIG. 1 is a view for use in describing operation of a reference pattern memory used in a conventional pattern recognition device.

Referring to FIG. 1, operation of a conventional pattern recognition device will be described first for a better understanding of this invention. The conventional pattern recognition device is substantially equivalent to the character recognition device described heretobefore and is for recognizing an input pattern signal representative of a plurality of input patterns.

As mentioned above, the character recognition device comprises a reference pattern memory 20 which is typically a character dictionary memory and memorizes a plurality of basic reference character patterns 21 and a plurality of memorized identifiers 22 identifying the basic reference character patterns 21. The reference pattern memory 20 further memorizes a plurality of additional reference character patterns 23 corresponding to the memorized identifiers 22. The additional reference character patterns 23 are given by modifying the basic reference character patterns 21. It is herein assumed that the basic and the additional character patterns represent numerals 0 through 9. The input patterns are therefore input character patterns representative of at least one of the numerals with repetition allowed.

Supplied with the input pattern signal representative of the input character patterns, the character recognition device compares each of the input character patterns with each of the basic and the additional reference character patterns 21 and 23 and searches a particular one of the basic and the additional reference character patterns 21 and 23 as a searched pattern. The particular one of the basic and the additional reference character patterns 21 and 23 has the lowest dissimilarity or the largest similarity with the input character pattern under consideration. The character recognition device thereby produces one of the memorized identifiers 22 that identifies the searched pattern.

It is, however, difficult to prepare the reference pattern memory 20 which memorizes a great number of the additional reference character patterns 23 into which the basic reference character patterns 21 are modified. This is because a great number of character pattern forms are possible for a same character pattern even if only one person repeatedly writes the same character pattern on a document. It is practically impossible to prepare the additional reference character patterns corresponding to the great number of the character pattern forms. It is therefore difficult for the character recognition device to accurately recognize each of the input character patterns.

Figure 2:
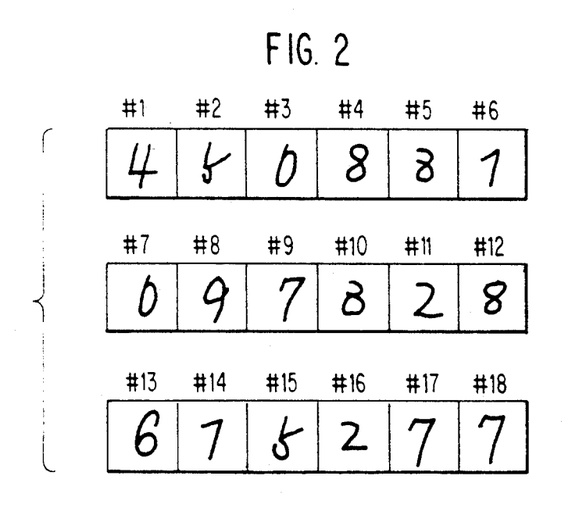
FIG. 2 exemplifies an input pattern signal for use in describing operation of a different conventional pattern recognition device and of an embodiment of this invention.
Figure 3:
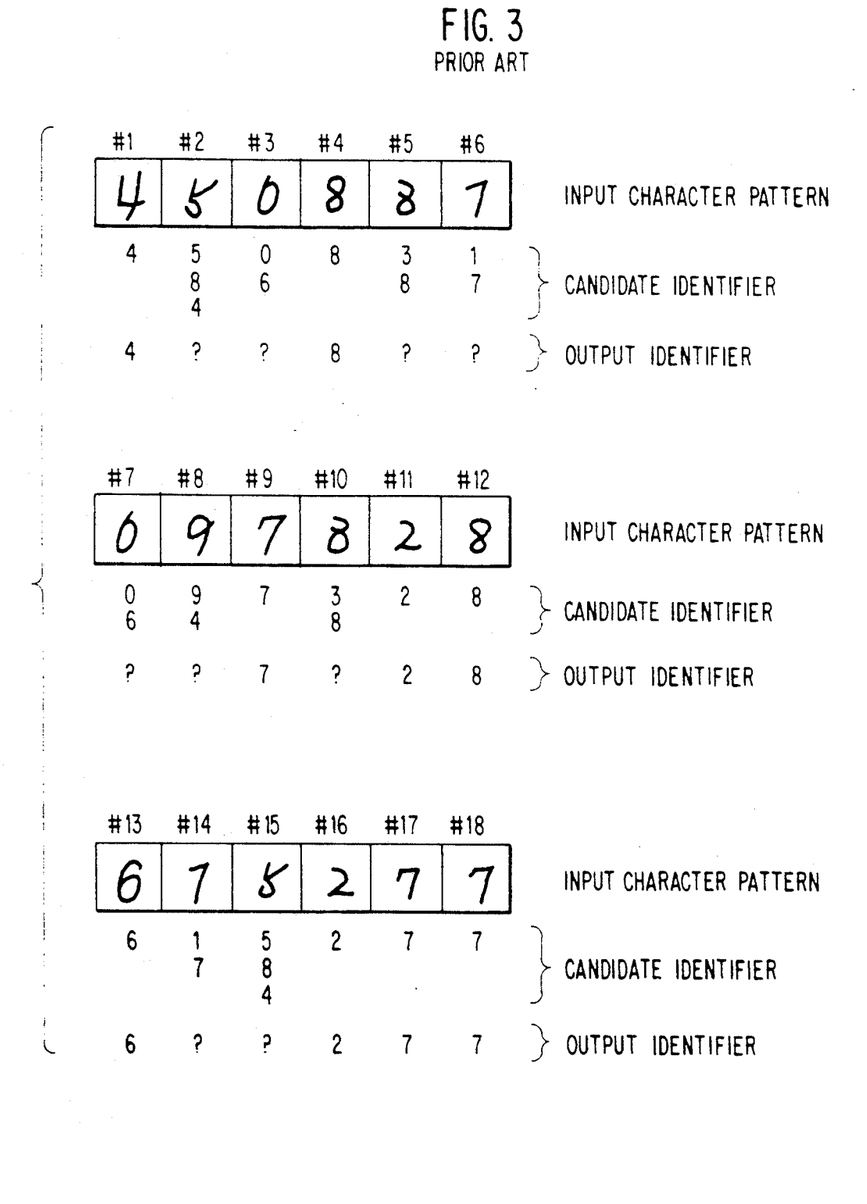
FIG. 3 is a view for use in describing operation of the different conventional pattern recognition device.

Referring continuously to FIG. 1 and referring afresh to FIGS. 2 and 3, description will proceed to a different character recognition device comprising a different reference pattern memory which memorizes only the basic reference character patterns 21 identified by the memorized identifiers 22. That is, the different reference pattern memory does not memorize the additional reference character patterns 23. It will be assumed that a person writes first through P-th input character patterns #1 to #P on a document as illustrated in FIG. 2, where P represents a first integer which is greater than one. In the example being illustrated, the first integer is equal to eighteen. The first through the eighteenth input character patterns are depicted in three lines merely for convenience of illustration.

Supplied with an input pattern signal representative of the input character patterns, the different character recognition device compares each of the input character patterns with each of the basic reference character patterns 21 and selects, as at least one selected pattern, at least one of the basic reference character patterns 21 that has a dissimilarity degree less than a predetermined degree with the input character pattern in question. The different character recognition device thereby produces, as a candidate identifier, at least one of the memorized identifiers 22 that corresponds to the above-mentioned at least one selected pattern. In this event, only one candidate identifier is not always produced for each of the input character patterns as illustrated in FIG. 3.

Referring more particularly to FIG. 3, only one candidate identifier indicative of the memorized identifier 4 is produced for the first input character pattern #1. Likewise, only one candidate identifier is produced for each of the fourth, the ninth, the eleventh through the thirteenth, and the sixteenth through the eighteenth input character patterns #4, #9, #11, #12, #13, #16, #17, and #18. For the second input character pattern #2, three candidate identifiers indicative of the memorized identifiers 5, 8, and 4 are produced. Likewise, a plurality of candidate identifiers are produced for each of the third, the fifth through the eighth, the tenth, the fourteenth, and the fifteenth input patterns #3, #5, #6, #7, #8, #10, #14, and #15.

When only one candidate identifier is produced for a particular one of the input character patterns, the different character recognition device produces the above-mentioned only one candidate identifier as one of the output identifiers that identifies the particular one of the input character patterns. On the other hand, when a plurality of candidate identifiers are produced for a different one of the input character patterns, the different character recognition device produces the different one of the input character patterns and a rejection code indicating that the character recognition device aborts, namely, is incapable of recognizing the different one of the input character patterns. At any rate, the different character recognition device can not accurately recognize each of the input character patterns.

Figure 4:
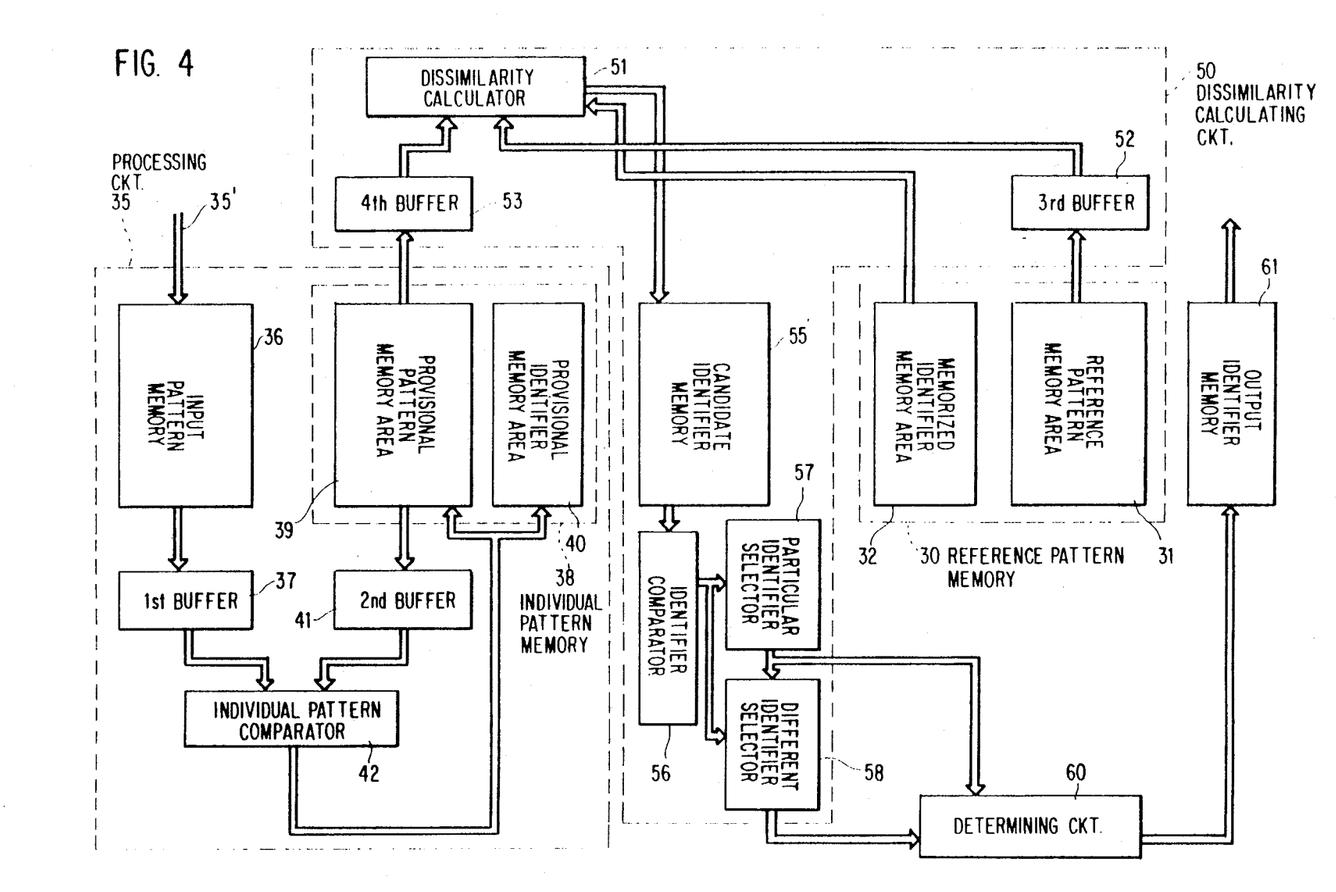
FIG. 4 is a block diagram of a pattern recognition device for use in carrying out a method according to an embodiment of this invention.
Figure 5:
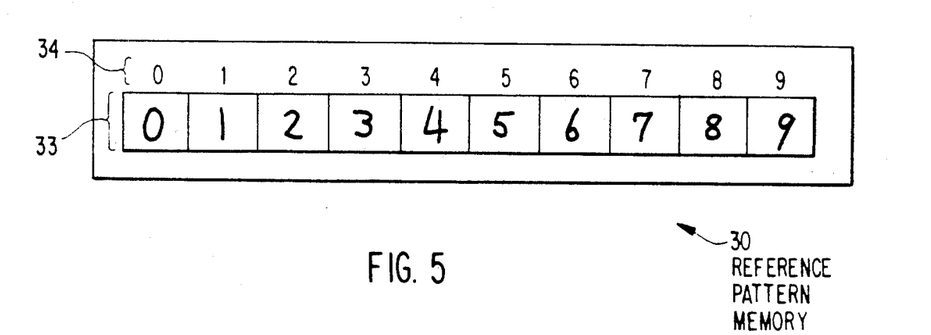
FIG. 5 is a view for use in describing operation of a reference pattern memory used in the pattern recognition device illustrated in FIG. 4.

Turning to FIGS. 4 and 5, description will proceed to a pattern recognition device for use in carrying out a method according to a preferred embodiment of this invention. The illustrated pattern recognition device is a character recognition device and is for recognizing an input pattern signal representative of first through P-th input character patterns by selecting first through P-th recognized patterns from a plurality of reference character patterns to produce a recognition result signal indicative of first through P-th output identifiers or true identifiers identifying the first through the P-th recognized patterns, where P represents a first integer which is greater than one. It should be noted here that the first through the P-th input character patterns and the reference character patterns are simply referred to as first through P-th input patterns and reference patterns, respectively.

The pattern recognition device comprises a reference pattern memory (namely, a character dictionary memory) 30 having a reference pattern memory area 31 and a memorized identifier memory area 32. The reference pattern memory area 31 memorizes the reference patterns. The memorized identifier memory area 32 memorizes the memorized identifiers identifying the reference patterns. The reference patterns are illustrated in FIG. 5 at a reference numeral 33. The memorized identifiers are illustrated at another reference numeral 34 in FIG. 5. The reference patterns 33 are substantially equivalent to the basic reference character patterns 21 illustrated in FIG. 1.

In FIG. 4, a processing circuit 35 is supplied with the input pattern signal through an input connector 35'. In the manner which will presently be described in more detail, the processing circuit 35 processes the first through the P-th input patterns into first through Q-th provisional patterns, where Q represents a second integer which is not greater than the above-mentioned plurality.

The processing circuit 35 comprises an input pattern memory 36 which is supplied with the input pattern signal through the input connector 35'. The input pattern memory 36 memorizes the first through the P-th input patterns as first through P-th memorized patterns and successively produces the first through the P-th memorized patterns through a first buffer 37 as individual input patterns. It is presumed that the input pattern signal can readily be partitioned into the first through the P-th input patterns. Thus, a combination of the input pattern memory 36 and the first buffer 37 serves as a pattern partitioning circuit supplied with the input pattern signal for partitioning the first through the P-th input patterns successively into the individual input patterns.

An individual pattern memory 38 has a provisional pattern memory area 39 for memorizing a content for successive renewal from a current content to a renewed content in the manner which will shortly be described. The individual pattern memory 38 further has a provisional identifier memory area 40 which will be described later.

Connected to the first buffer 37 directly and to the provisional pattern memory area 39 of the individual pattern memory 38 through a second buffer 41, an individual pattern comparator 42 compares each of the individual input patterns with the current content and produces the individual input pattern under consideration as one of the first through the Q-th provisional patterns when the individual input pattern under consideration is not found in the current content. Preferably, the individual pattern comparator 42 also produces, when the individual input pattern under consideration is not found in the current content, a provisional identifier identifying the above-mentioned one of the first through the Q-th provisional patterns.

The individual pattern comparator 42 stores the above-mentioned one of the first through the Q-th provisional patterns in the provisional pattern memory area 39 of the individual pattern memory 38 to thereby renew the current content. The individual pattern comparator 42 also stores in the provisional identifier memory area 40 the provisional identifier identifying the above-mentioned one of the first through the Q-th provisional patterns. The provisional pattern memory area 39 of the individual pattern memory 38 memorizes the first through the Q-th provisional patterns eventually after the first through the P-th input patterns are processed by the pattern partitioning circuit (namely, the combination of the input pattern memory 36 and the first buffer 37) and by the individual pattern comparator 42. Likewise, the provisional identifier memory area 40 of the individual pattern memory 38 memorizes first through Q-th provisional identifiers identifying the first through the Q-th provisional patterns eventually after the first through the P-th input patterns are processed by the pattern partitioning circuit and by the individual pattern comparator 42.

Thus, the individual pattern comparator 42 stores in the provisional pattern memory area 39 of the individual pattern memory 38 the first through the Q-th provisional patterns which are different from one another. A dissimilarity degree would be never equal to zero between two of character patterns which a same person writes many times for a same character. However, the dissimilarity degree between two of character patterns which the same person writes many times for the same character, is less than that between two of different character patterns which the same person writes for different characters. Under the circumstances, it is preferable that the individual pattern comparator 42 stores each of the individual input patterns as the above-mentioned one of the first through the Q-th provisional patterns when a distance indicative of the dissimilarity degree is less than a preselected value between the individual input pattern under consideration and each provisional pattern already memorized in the provisional pattern memory area 39 as the current content. When the distance is not less than the preselected value between the individual input pattern under consideration and a special provisional pattern already memorized in the provisional pattern memory area 39 as the current content, it is preferable that the individual pattern comparator 42 stores, instead of the special provisional pattern, a modified pattern which has a mean position between the individual input pattern under consideration and the special provisional pattern.

Referring continuously to FIG. 4 and referring afresh to FIGS. 6 and 7, description will be made as regards to the first through the Q-th provisional identifiers and the first through the Q-th provisional patterns more in detail. It is assumed in connection with FIG. 4 that the pattern recognition device is supplied with the input pattern signal representative of the first through the P-th input patterns illustrated in FIG. 2. In the illustrated example, the P-th input pattern corresponds to the eighteenth input pattern #18.

Figure 6:
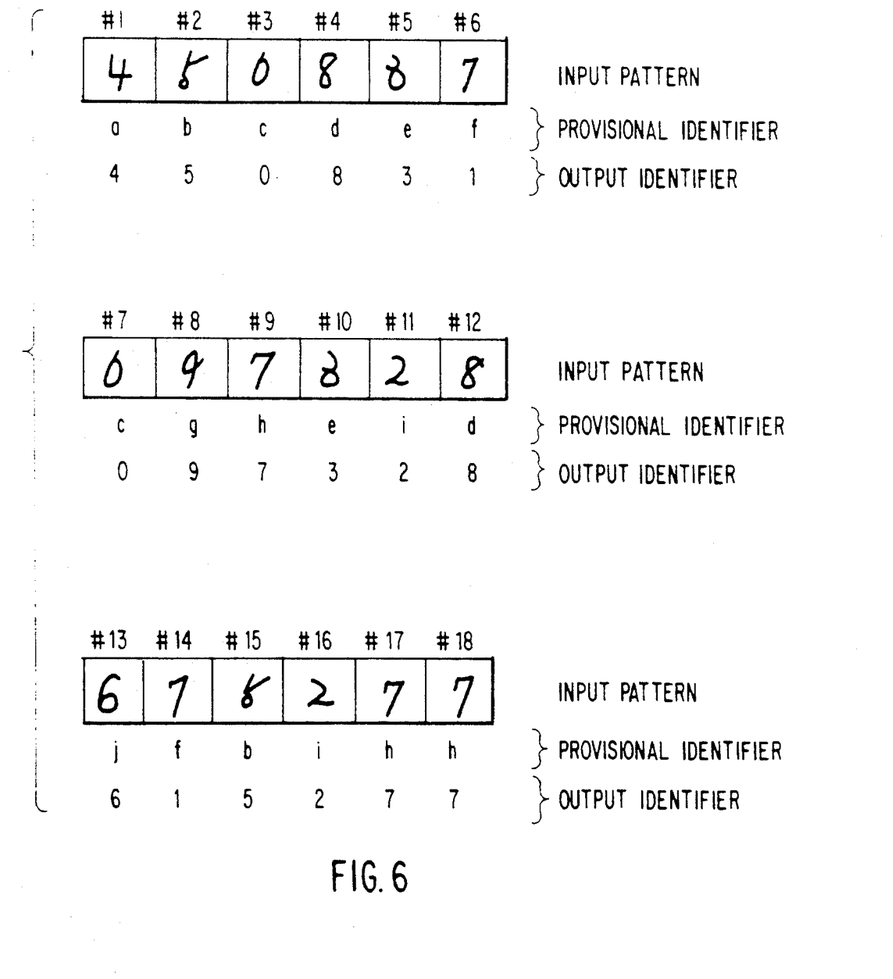
FIG. 6 is a view for use in describing operation of the pattern recognition device illustrated in FIG. 4.

In this case, the individual pattern comparator 42 produces the first through the Q-th provisional identifiers a, b, c, d, e, f, g, h, i, and j as illustrated in FIG. 6. In the example being illustrated in FIG. 6, the Q-th provisional identifier is a tenth provisional identifier. More specifically, the first through the sixth provisional identifiers a, b, c, d, e, and f are produced for the first through the sixth input patterns #1 to #6, respectively. For the seventh input pattern #7, the third provisional identifier c is produced because the seventh input pattern #7 is equivalent to the third input pattern #3. For the eighth and the ninth input patterns #8 and #9, the seventh and the eighth provisional identifiers g and h are produced, respectively. For the tenth input pattern #10, the fifth provisional identifier e is produced because the tenth input pattern #10 is equivalent to the fifth input pattern #5. The ninth and the tenth provisional identifiers i and j are produced for the eleventh and the thirteenth input patterns #11 and #13, respectively. For the twelfth, the fourteenth through the eighteenth input patterns #12, #14, #15, #16, #17, and #18, the fourth, the sixth, the second, the ninth, the eighth, and the eighth, identifiers d, f, b, i, h, and h are produced respectively.

Figure 7:
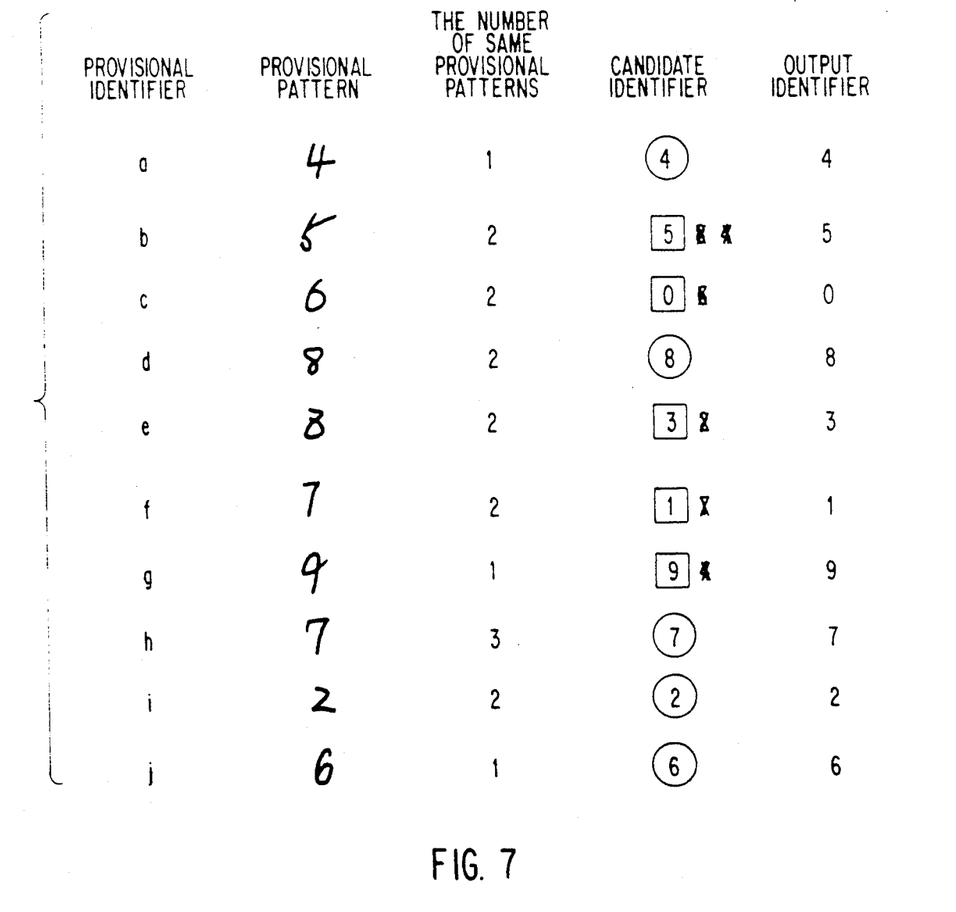
FIG. 7 is another view for use in describing operation of the pattern recognition device illustrated in FIG. 4.

The first through the Q-th (tenth) provisional patterns are illustrated in FIG. 7 in correspondence to the first through the Q-th (tenth) provisional identifiers a, b, c, d, e, f, g, h, i, and j. The number of same provisional patterns of each of the first through the Q-th provisional patterns are also illustrated in FIG. 7 in correspondence to the first through the Q-th (tenth) provisional identifiers.

Referring continuously to FIGS. 4 and 7, a dissimilarity calculating circuit 50 is connected to the reference pattern and the memorized identifier memory areas 31 and 32 of the reference pattern memory 30 and to the provisional pattern memory area 39 of the individual pattern memory 38 of the processing circuit 35. The dissimilarity calculating circuit 50 calculates dissimilarity degrees (or similarity degrees) had by the reference patterns relative to the first through the Q-th provisional patterns to select, with repetition allowed as selected patterns, the reference patterns which have the dissimilarity degrees less than (or the similarity degrees greater than) a predetermined degree. For example, the dissimilarity degrees are given by calculating a distance between each of the first through the Q-th provisional patterns and each of the reference patterns in the manner known in the art. The dissimilarity calculating circuit 50 thereby selects R particular identifiers and S different identifiers collectively as candidate identifiers from the memorized identifiers, where R plus S is not greater than the first integer and is not less than the second integer. Each of the R particular identifiers identifies only one pattern of the selected patterns. Each of the S different identifiers identifies one of at least two patterns of the selected patterns. The other at least one of the above-mentioned at least two patterns is identified by at least one of the R particular identifiers.

When the pattern recognition device is supplied with the input pattern signal representative of the input patterns of the type exemplified in FIG. 2, the candidate identifiers are produced as illustrated in FIG. 7. In FIG. 7, at least one of the candidate identifiers is produced for each of the first through the Q-th (tenth) provisional patterns. More specifically, only one candidate identifier is produced for each of the first, the fourth, the eighth, the ninth, and the tenth provisional patterns identified by the first, the fourth, the eighth, the ninth, and the tenth provisional identifiers a, d, h, i, and j. Three candidate identifiers are produced for the second provisional pattern identified by the second provisional identifier b. Two candidate identifiers are produced for each of the third, the fifth, the sixth, and the seventh provisional patterns identified by the third, the fifth, the sixth, and the seventh provisional identifiers c, e, f, and g.

As described above, each of the R particular identifiers of the candidate identifiers identifies only one pattern of the selected patterns. In FIG. 7, each of the R particular identifiers is encircled by a circle merely for brevity of description. In the illustrated example, the R particular identifiers identify the memorized identifiers 4, 8, 7, 2, and 6. As also mentioned above, each of the S different identifiers of the candidate identifiers identifies one of at least two patterns of the selected patterns. In FIG. 7, each of the S different identifiers is enclosed by a rectangle merely for brevity of description. In the illustrated example, the S different identifiers identify the memorized identifiers 5, 0, 3, 1, and 9. The other at least one of the above-mentioned at least two patterns is identified by at least one of the R particular identifiers as describe above. In FIG. 7, the above-mentioned at least one of the R particular identifiers is specified by a symbol X merely for brevity of description and is never used as any one of the first through the P-th output identifiers. As illustrated at the most right-hand side in FIG. 7, the output identifiers are determined in correspondence to the first through the Q-th provisional patterns by using the R particular and the S different identifiers in the manner which will become clear as the description proceeds.

In FIG. 4, the dissimilarity calculating circuit 50 comprises a dissimilarly calculator 51 connected to the reference pattern memory area 31 through a third buffer 52, to the provisional pattern memory area 39 through the fourth buffer 53, and to the memorized identifier memory area 32 directly. The dissimilarity calculator 51 calculates the dissimilarity degrees to select the selected patterns and to select the candidate identifiers from the memorized identifiers. The candidate identifiers identify the selected patterns.

A candidate identifier memory 55 is connected to the dissimilarity calculator 51. The candidate identifier memory 55 memorizes the candidate identifiers in correspondence to the first through the Q-th provisional patterns.

An identifier comparator 56 is connected to the candidate identifier memory 55. The identifier comparator 56 compares the candidate identifiers with one another to check whether a single identifier or a combination of identifiers of the candidate identifiers is memorized in the candidate identifier memory 55 in correspondence to each of the first through the Q-th provisional patterns.

A particular identifier selector 57 is connected to the identifier comparator 56. The particular identifier selector 57 selects, as each of the R particular identifiers, the single identifier which is encircled by a circle in FIG. 7.

A different identifier selector 58 is connected to the identifier comparator 56 and the particular identifier selector 57. The different identifier selector 58 selects, as each of the S different identifiers, a sole identifier of the combination of identifiers that is different from the R particular identifiers and that is enclosed by a rectangle in FIG. 7.

Thus, a combination of the identifier comparator 56, the particular identifier selector 57, and the different identifier selector 58 serves as a classifying circuit. The classifying circuit is connected to the candidate identifier memory 55 for classifying the candidate identifiers into the R particular identifiers and the S different identifiers.

Referring continuously to FIGS. 4 and 7 and referring again to FIG. 6, description will proceed to a determining circuit 60. Connected to the particular and the different identifier selectors 57 and 58 of the dissimilarity calculating circuit 50, the determining circuit 60 determines the first through the P-th output identifiers by using the R particular identifiers and the S different identifiers as ones, R in number, and others, S in number, of the first through the P-th output identifiers. Connected to the determining circuit 60, an output identifier memory 61 memorizes the first through the P-th output identifiers.

When the pattern recognition device is supplied with the input pattern signal representative of the input patterns of the type exemplified in FIG. 2, the output identifiers are determined in correspondence to the first through the Q-th (tenth) provisional patterns by using the R particular and the S different identifiers as illustrated at the most right-hand side in FIG. 7. As a result, the first through the P-th output identifiers are determined in correspondence to the first through the P-th input patterns as illustrated in FIG. 6.

Reviewing FIGS. 4 through 7, it should be noted that the pattern recognition device aborts if R plus S does not become equal to the first integer. The pattern recognition device aborts when R is not greater than a predetermined number, such as zero. In such an event, at least one of the first through the P-th input patterns should be dealt with by using a rejection code which may be visually displayed on a display unit together with the above-mentioned at least one of the first through the P-th input patterns and be processed like in the different character recognition device described before.

While this invention has thus far been described in conjunction with a single embodiment thereof, it will readily be possible for those skilled in the art to put this invention into practice in various other manners. For example, a modified pattern recognition device uses similarity degrees instead of the dissimilarity degrees used in the pattern recognition device illustrated in FIG. 4. The modified pattern recognition device is equivalent to the pattern recognition device illustrated in FIG. 4. In addition, operation of the pattern recognition device illustrated in FIG. 4 may be carried out in a computer system which comprises either firmware or software which is programmed to execute the operation.

What is claimed is:

1. A method of recognizing an input pattern signal representative of first through P-th input patterns by selecting first through P-th recognized patterns from a plurality of reference patterns to produce a recognition result signal indicative of first through P-th output identifiers identifying said first through said P-th recognized patterns, where P represents a first integer which is greater than one, said method comprising the steps of:

memorizing said reference patterns and a plurality of memorized identifiers identifying said reference patterns;

processing said first through said P-th input patterns into first through Q-th provisional patterns, where Q represents a second integer which is not greater than the number of said plurality of reference patterns;

calculating dissimilarity degrees had by said reference patterns relative to said first through said Q-th provisional patterns to select, with repeated selection, said reference patterns which have the dissimilarity degrees less than a predetermined degree as selected patterns, said calculating step thereby selecting a first plurality of particular identifiers and a second plurality of different identifiers from said memorized identifiers corresponding to said selected patterns, where a sum of said first and second pluralities is not greater than said first integer and is not less than said second integer, each of said particular identifiers identifying only one of said selected patterns without said repeated selection, and each of said different identifiers identifying one of at least two of said selected patterns with said repeated selection, at least one of said at least two of said selected patterns being identified by at least one of said particular identifiers; and determining said first through said P-th output identifiers by using said particular identifiers and said different identifiers.

2. A method as claimed in claim 1, wherein said processing step comprises the steps of:

partitioning said first through said P-th input patterns successively into individual input patterns;

memorizing said first through Q-th provisional patterns as stored provisional patterns; and comparing each of said individual input patterns with said stored provisional patterns to include each of said individual input patterns as one of said first through said Q-th provisional patterns when each of said individual input patterns is not currently one of said stored provisional patterns, said comparing step memorizing one of said first through said Q-th provisional patterns to thereby update said stored provisional patterns;

said memorizing step memorizing said first through said Q-th provisional patterns eventually after said first through said P-th input patterns are processed by said partitioning step and by said comparing step.

3. A method as claimed in claim 1, wherein said calculating step comprises the steps of:

calculating said dissimilarity degrees to select said selected patterns and to select candidate identifiers from said memorized identifiers, said candidate identifiers identifying said selected patterns;

memorizing said candidate identifiers in correspondence to said first through said Q-th provisional patterns; and classifying said candidate identifiers into said particular identifiers and said different identifiers based on the number of said candidate identifiers corresponding to said first through said Q-th provisional patterns.

4. A method as claimed in claim 3, wherein said classifying step comprises the steps of:

comparing said candidate identifiers with one another to check whether a single identifier or a combination of identifiers of said candidate identifiers is memorized in said candidate identifier memorizing step in correspondence to each of said first through said Q-th provisional patterns;

selecting said single identifier as each of said R particular identifiers; and selecting, as each of said different identifiers, a sole identifier of said combination of identifiers that is different from said particular identifiers.

5. A method as claimed in claim 3, wherein said determining step is for determining said particular identifiers and said different identifiers as said first through said P-th output identifiers with reference to said first through said Q-th provisional patterns.

6. A pattern recognition device for recognizing an input pattern signal representative of first through P-th input patterns by selecting first through P-th recognized patterns from a plurality of reference patterns to produce a recognition result signal indicative of first through P-th output identifiers identifying said first through said P-th recognized patterns, where P represents a first integer which is greater than one, said pattern recognition device comprising:

a reference pattern memory for memorizing said reference patterns and a plurality of memorized identifiers identifying said reference patterns;

processing means supplied with said input pattern signal for processing said first through said P-th input patterns into first through Q-th provisional patterns, where Q represents a second integer which is not greater than the number of said plurality of reference patterns;

dissimilarity calculating means connected to said reference pattern memory and said processing means for calculating dissimilarity degrees had by said reference patterns relative to said first through said Q-th provisional patterns to select, with repeated selection, said reference patterns which have the dissimilarity degrees less than a predetermined degree as selected patterns, said dissimilarity calculating means thereby selecting a first plurality of particular identifiers and a second plurality of different identifiers from said memorized identifiers corresponding to said selected patterns, where a sum of said first and second pluralities is not greater than said first integer and is not less than said second integer, each of said particular identifiers identifying only one of said selected patterns without said repeated selection, and each of said different identifiers identifying one of at least two of said selected patterns with said repeated selection, at least one of said at least two of said selected patterns being identified by at least one of said particular identifiers; and determining means connected to said dissimilarity calculating means for determining said first through said P-th output identifiers by using said particular identifiers and said different identifiers.

7. A pattern recognition device as claimed in claim 6, wherein said processing means comprises:

pattern partitioning means supplied with said input pattern signal for partitioning said first through said P-th input patterns successively into individual input patterns;

an individual pattern memory for memorizing said first through Q-th provisional patterns as stored provisional patterns; and individual pattern comparing means connected to said pattern partitioning means and said individual pattern memory for comparing each of said individual input patterns with said stored provisional patterns to include each of said individual input patterns as one of said first through said Q-th provisional patterns when each of said individual input patterns is not currently one of said stored provisional patterns, said individual pattern comparing means memorizing one of said first through said Q-th provisional patterns in said individual pattern memory to thereby update said stored provisional patterns;

said individual pattern memory memorizing said first through said Q-th provisional patterns eventually after said first through said P-th input patterns are processed by said pattern partitioning means and by said individual pattern comparing means.

8. A pattern recognition device as claimed in claim 6, wherein said dissimilarity calculating means comprises:

a dissimilarity calculator connected to said reference pattern memory and said processing means for calculating said dissimilarity degrees to select said selected patterns and to select candidate identifiers from said memorized identifiers, said candidate identifiers identifying said selected patterns;

a candidate identifier memory connected to said dissimilarity calculator for memorizing said candidate identifiers in correspondence to said first through said Q-th provisional patterns; and classifying means connected to said candidate identifier memory for classifying said candidate identifiers into said particular identifiers and said different identifiers based on the number of said candidate identifiers corresponding to said first through said Q-th provisional pattern.

9. A pattern recognition device as claimed in claim 8, wherein said classifying means comprises:

an identifier comparator connected to said candidate identifier memory for comparing said candidate identifiers with one another to check whether a single identifier or a combination of identifiers of said candidate identifiers is memorized in said candidate identifier memory in correspondence to each of said first through said Q-th provisional patterns;

a particular identifier selector connected to said identifier comparator for selecting said single identifier as each of said particular identifiers; and a different identifier selector connected to said identifier comparator and said particular identifier selector for selecting, as each of said different identifiers, a sole identifier or said combination of identifiers that is different from said particular identifiers.

* * * * *